(12) United States Patent  
Levesque et al.

(10) Patent No.: US 9,202,351 B2  
(45) Date of Patent: Dec. 1, 2015

(54) SYSTEMS AND METHODS FOR HAPTICS IN VIBRATING ENVIRONMENTS AND DEVICES

(71) Applicants: Vincent Levesque, Montreal (CA); Amaya Weddle, San Jose, CA (US)

(72) Inventors: Vincent Levesque, Montreal (CA); Amaya Weddle, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 104 days.

(21) Appl. No.: 13/792,337

(22) Filed: Mar. 11, 2013

(65) Prior Publication Data

US 2014/0253302 A1   Sep. 11, 2014

(51) Int. Cl.
- *H04B 3/36* (2006.01)
- *G01D 21/00* (2006.01)
- *G08B 6/00* (2006.01)
- *G06F 3/01* (2006.01)

(52) U.S. Cl.
CPC . *G08B 6/00* (2013.01); *G06F 3/016* (2013.01)

(58) Field of Classification Search
CPC ........... G08B 6/00; G01P 21/00; G01R 35/00
USPC ...................................................... 340/407.1
See application file for complete search history.

(56) References Cited

U.S. PATENT DOCUMENTS

| | | | |
|---|---|---|---|
| 8,378,797 B2 * | 2/2013 | Pance et al. ................ | 340/407.2 |
| 8,405,522 B2 * | 3/2013 | Shaffer et al. ................ | 340/905 |
| 8,547,333 B2 * | 10/2013 | Pasquero et al. ............. | 345/161 |
| 8,621,348 B2 * | 12/2013 | Ramsay et al. ............... | 715/702 |
| 8,686,952 B2 * | 4/2014 | Burrough et al. ............. | 345/173 |
| 8,896,524 B2 | 11/2014 | Birnbaum et al. | |
| 2009/0259359 A1 * | 10/2009 | Whitton et al. ................. | 701/33 |
| 2011/0187651 A1 * | 8/2011 | Whitlow et al. .............. | 345/173 |
| 2013/0078976 A1 * | 3/2013 | Naftolin ........................ | 455/418 |
| 2014/0052401 A1 * | 2/2014 | Riley et al. ...................... | 702/89 |

OTHER PUBLICATIONS

Active Vibration Control, web page at http://en.wikipedia.org/wiki/Active_vibration_control, as available via the Internet, Sep. 3, 2013

* cited by examiner

*Primary Examiner* — Jennifer Mehmood  
*Assistant Examiner* — John Mortell  
(74) *Attorney, Agent, or Firm* — Kilpatrick Townsend & Stockton LLP

(57) ABSTRACT

Systems and methods for haptics in vibrating environments and devices are disclosed. For example, one described system includes: a haptic output device; a processor coupled to the haptic output device, the processor configured to: determine that a haptic effect should be generated; receive a signal associated with a parasitic vibration; determine a haptic effect based in part on the parasitic vibration; and output a haptic signal associated with the haptic effect to the haptic output device.

20 Claims, 5 Drawing Sheets

SYSTEMS AND METHODS FOR HAPTICS IN VIBRATING ENVIRONMENTS AND DEVICES

FIELD OF THE INVENTION

The present invention generally relates to haptic feedback, and more particularly to systems and methods for haptic feedback in vibrating environments and devices.

BACKGROUND

Haptic feedback can provide a conduit for electronic devices to communicate information to users. This conduit can be in addition to standard visual or auditory effects. The number of devices that include some form of haptic feedback has increased dramatically over the past several years. However, some of these devices already output vibrations, for example, as a byproduct of their regular operation. Further, many devices may be used in a vibrating environment. Either of these may dull or overwhelm haptic effects. Accordingly, there is a need for a device to compensate for these background vibrations.

SUMMARY

Embodiments of the present disclosure include devices featuring haptics in vibrating environments and devices. In one embodiment, a system according to the present disclosure may comprise: a haptic output device; a processor coupled to the haptic output device, the processor configured to: determine that a haptic effect should be generated; receive a signal associated with a parasitic vibration; determine a haptic effect based in part on the parasitic vibration; and output a haptic signal associated with the haptic effect to the haptic output device.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION

Figure 1:
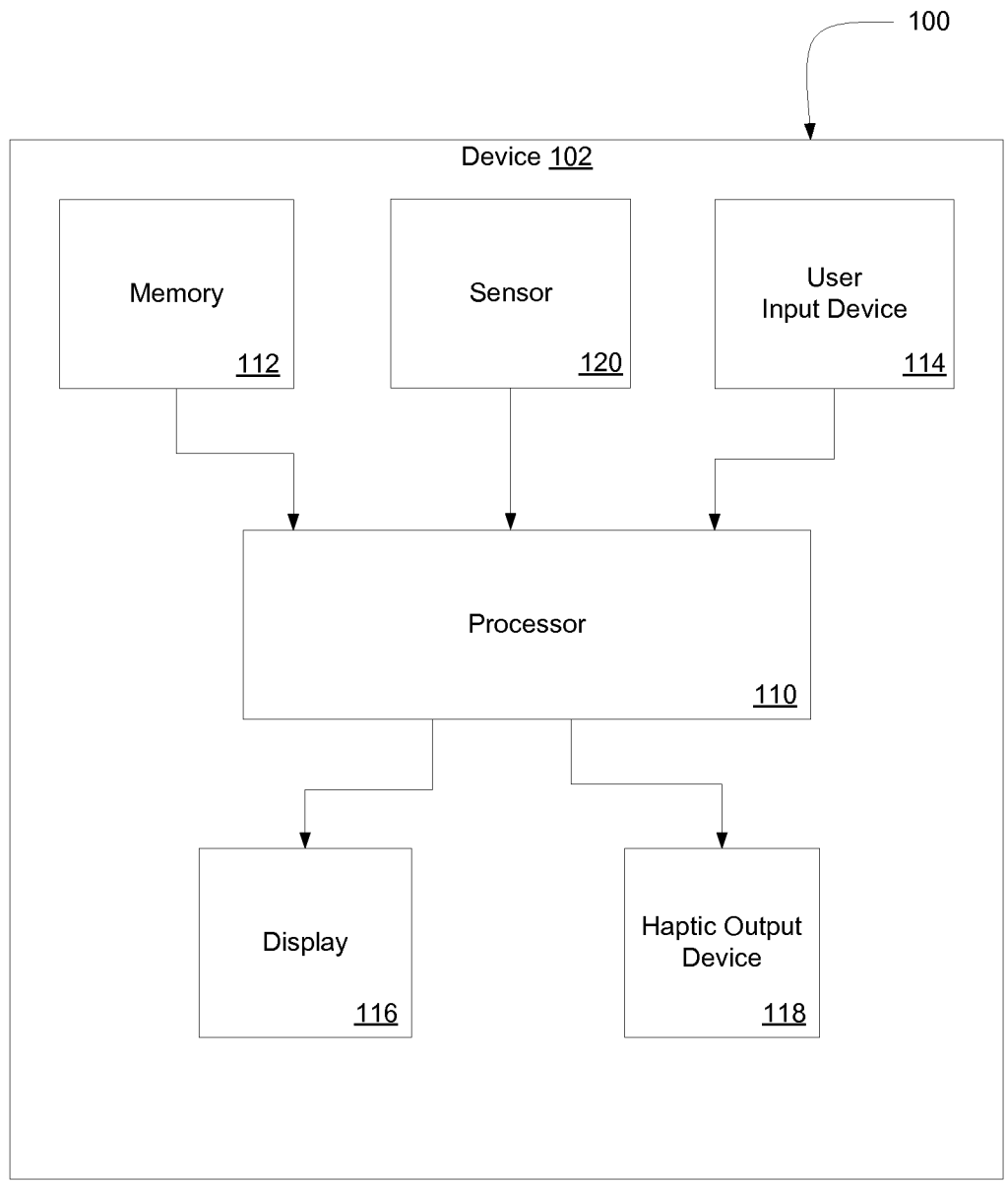
FIG. 1 is a block diagram of systems and methods for haptics in vibrating environments and devices according to one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Illustrative Embodiment of Haptics in a Vibrating Environments or Devices

One illustrative embodiment of the present disclosure comprises a device that may be used in an environment prone to vibration, for example, a smartphone comprising a haptic output device and a user interface through which the user feels haptic effects. A mobile device of the illustrative embodiment may be used in for example, a car, an airplane, a bus, a train, or some other environment that has substantial vibrations. These parasitic vibrations may interfere with the haptic effects output by the illustrative mobile device. For example, a parasitic vibration may mask a vibration output by the haptic output device.

The illustrative embodiment of the present disclosure comprises systems for compensating for these parasitic vibrations. For example, the illustrative embodiment may comprise a data store comprising data associated with the parasitic vibrations. This data store may be local to the mobile device, or accessible via a network connection. Thus, in the illustrative embodiment, when the user is in a location associated with parasitic vibrations the illustrative mobile device may receive a signal from the data store. Based on this signal, the illustrative mobile device may determine a haptic effect that is distinguishable from the parasitic vibration.

This distinguishable haptic effect may comprise one or more of many potential haptic effects. For example, the haptic effect may comprise a vibration based effect configured to be felt in spite of the parasitic vibration, e.g. a haptic effect at a different frequency and/or amplitude than the vibration and thus distinguishable from the parasitic vibration. In another embodiment, the haptic effect may comprise an effect configured to compensate for the parasitic vibrations. For example, the haptic effect may comprise a vibration at a frequency and amplitude configured to compensate for, or mask (e.g. "reduce" or "cancel") the parasitic vibration.

In yet another embodiment, the haptic effect may comprise a skin stretching effect, an electrostatic based effect, or a surface deformation effect. In such an embodiment the parasitic vibration may have little or no impact on the haptic effect. Further, in some embodiments, the haptic effect may comprise a non-vibration based effect.

In still another embodiment, the haptic effect may comprise an effect configured to control the parasitic vibration. For example, in one embodiment the parasitic vibration may be the result of the normal operation of the device. In one such embodiment, the device may comprise a motor that outputs the parasitic vibration. In this embodiment, the haptic effect may comprise controlling the motor to vary the parasitic vibration, and thus output a perceptible haptic effect.

Thus, in the illustrative embodiment, the mobile device may output a haptic effect that the user can perceive despite the parasitic vibration. This may enable the user to use the illustrative device in a vibrating environment, e.g. in a car, train, or airplane.

In another illustrative embodiment, the device may be incorporated into the vibrating environment. For example, the illustrative device may comprise a touch screen display for use in a car stereo or a touch screen for use in an airplane entertainment system. In such an embodiment, the device may output a haptic effect that is distinguishable from the vibration of the larger system (e.g. the vibration as the car moves over the road or as the airplane experiences turbulence).

In yet another illustrative embodiment, the device may be a device that already includes a vibration, e.g. an electric razor, a kitchen appliance, or piece of industrial equipment. In such an embodiment, the parasitic vibration may be generated by a motor on the device. Thus, the haptic effect may be associated with controlling this motor, e.g. briefly stopping or slowing its operation, and thus generating a perceptible haptic effect by stopping or slowing the parasitic vibration.

These illustrative examples are given to introduce the reader to the general subject matter discussed herein. The invention is not limited to these examples. The following sections describe various additional embodiments and examples of systems and methods for haptics in vibrating environments Referring now to the drawings in which like numerals indicate like elements throughout the several Figures, FIG. 1 is a block diagram of a system for haptics in vibrating environments and devices according to one embodiment of the disclosure.

The system 100 shown in FIG. 1 comprises a device 102. In some embodiments device 102 may comprise one of a variety of handheld devices, such as a mobile phone, a personal digital assistant (PDA), or a handheld navigation system. In other embodiments, the present disclosure may be implemented in a device that is not portable, for example, in an automobile console, an airplane console, a console for industrial equipment, a household appliance, a gaming console, or other electronic device.

Embodiments of the present disclosure can be implemented in combination with, or may comprise combinations of: digital electronic circuitry, computer hardware, firmware, and software. The device 102 shown in FIG. 1 comprises a processor 110. The processor 110 receives input signals and generates signals for communication, display, and providing haptic feedback. The processor 110 includes or is in communication with one or more computer-readable media, such as memory 112, which may comprise random access memory (RAM).

The processor 110 executes computer-executable program instructions stored in memory 112, such as executing one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that may store instructions, which, when executed by the processor 110, cause it to perform various steps, such as those described herein. Embodiments of computer-readable media may comprise, but are not limited to, non-transient computer readable media such as, an electronic, optical, magnetic, or other storage or transmission device capable of providing the processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 110, and the processing, described may be in one or more structures, and may be dispersed throughout one or more structures.

In some embodiments, memory 112 may further comprise a data store comprising data associated with the parasitic vibrations. For example, memory 112 may comprise a database of parasitic vibrations associated with various environments, which is accessible by processor 110. For example, in some embodiments, memory 112 may comprise a database of one or more templates of parasitic vibrations. These templates may comprise data associated with parasitic vibrations in common environments. For example, in some embodiments the templates may comprise data associated with vibrations: on an airplane (e.g. in various levels of turbulence), a bus on various types of roads, a car on various types of roads, or another environment associated with background vibrations.

Referring still to FIG. 1, the device 102 also comprises a user input device 114 in communication with the processor 110. For example, in some embodiments the user input device 114 may comprise a touchscreen. In such an embodiment, user input device 114 may sense user interaction as well as the location of the interaction. One such embodiment comprises a capacitance-based touchscreen. In other embodiments, user input device 114 may comprise a button, switch, slider, or trackball. In still other embodiments, the device 102 may comprise both a touch screen and an additional user input device 114.

The device 102 also comprises a display 116. Display 116 is in communication with processor 110 and is configured to display output from the processor 110 to the user. For instance, in one embodiment, the device 102 comprises a liquid crystal display (LCD) disposed beneath the user input device 114. In some embodiments, the display 116 and user input device 114 may comprise a single, integrated component, such as a touch-screen LCD. In some embodiments, device 102 may not comprise a display.

The device 102 also comprises a haptic output device 118, which is in communication with the processor 110 and configured to output a haptic effect. The processor 110 outputs a haptic signal to the haptic output device 118, which then outputs a haptic effect based on the haptic signal. For instance, the processor 110 may output a haptic signal designed to cause the haptic output device 118 to vibrate. In other embodiments, in response to the haptic signal, haptic output device 118 may output a different type of haptic effect. For example, in some embodiments, haptic output device 118 is configured to output a haptic effect varying a perceived coefficient of friction of a touch surface. Additionally or alternatively, haptic output device 118 may provide vibrotactile haptic effects that move user input device 114, or other components of device 102, in a controlled manner.

In some embodiments, haptic output device 118 may comprise an actuator coupled to a housing of the device 102, and some haptic effects may use multiple actuators in sequence and/or in concert. For example, in one embodiment the perceptible coefficient of friction can be varied by vibrating the surface at varying frequencies above a threshold. In another embodiment, different combinations/sequences of variance can be used to simulate other effects.

Although a single haptic output device 118 is shown in FIG. 1, some embodiments may use multiple haptic output devices of the same or different type to output varying types of effects. For example, in one embodiment, a piezoelectric actuator is used to displace some or all of a touch surface vertically and/or horizontally at ultrasonic frequencies, such as by using an actuator moving at frequencies greater than 20 kHz. In some embodiments, multiple actuators such as eccentric rotating mass motors and linear resonant actuators can be used alone or in concert to provide other haptic effects. In another embodiment, haptic output device 118 may comprise an electrostatic actuator, or an actuator configured to modify the shape of one or more components of device 102.

In still other embodiments, haptic output device 118 may comprise a device configured to vary a vibration output by another motor on device 102. For example, haptic output device 118 may comprise an additional mass to be applied to the motor in order to vary the rotation of that motor and generate a vibration. In another embodiment, haptic output device 118 may comprise a device configured to vary a structural characteristic of a housing or a mount associated with the motor. This may vary the parasitic vibration in a way that is perceptible to the user of device 102.

The device 102 also comprises a sensor 120. The sensor 120 is configured to detect a parasitic vibration, and transmit a signal associated with the parasitic vibration to the processor 110. In some embodiments, sensor 120 may be a component of haptic output device 118. For example, haptic output device 118 may comprise a piezoelectric actuator that also serves as a sensor to detect parasitic vibrations. In other embodiments, sensor 120 comprises another type of vibration detection device, for example, an accelerometer. In still another embodiment, sensor 120 comprises a sensor configured to determine the location of device 102. For example, sensor 120 may comprise a GPS sensor configured to determine whether the device 102 is currently in an area associated with a specific type of parasitic vibration, e.g. a road, a train, an airplane, or some other location associated with a parasitic vibration. In some embodiments, sensor 120 is not a required component of device 102.

Figure 2A:
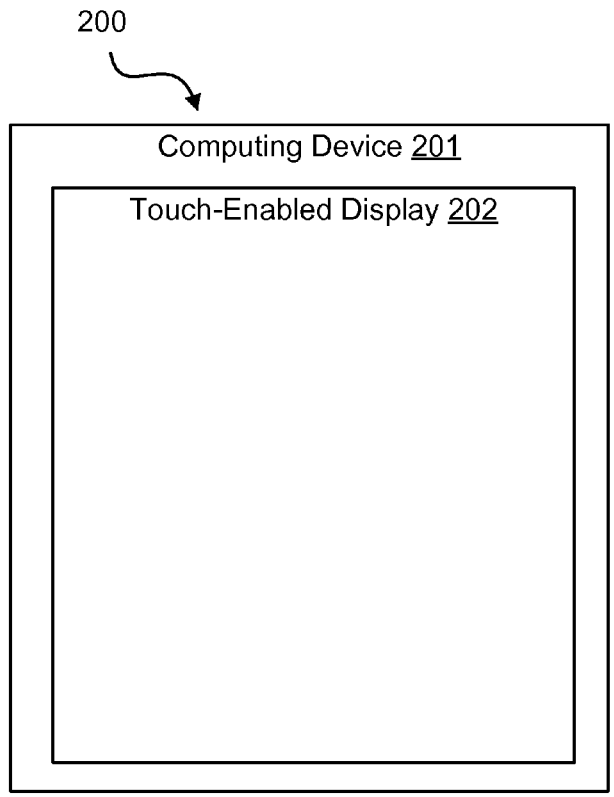
FIG. 2A is an illustration of one embodiment of a system for haptics in vibrating environments and devices.
Figure 2B:
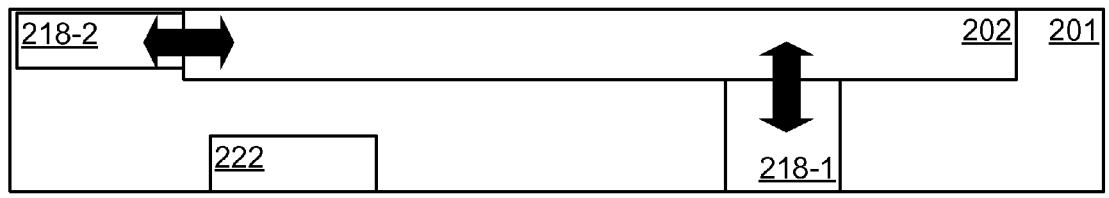
FIG. 2B is an illustration of one embodiment of a system for haptics in vibrating environments and devices.

Turning now to FIGS. 2A-2B, which illustrate an example of a system for haptics in vibrating environments or devices. FIG. 2A is a diagram illustrating an external view of a system 200 comprising a computing device 201 that comprises a touch-enabled display 202. FIG. 2B shows a cross-sectional view of device 201. Device 201 may be configured similarly to device 102 described above with regard to FIG. 1, though components such as the processor, memory, sensors, and the like are not shown in this view for purposes of clarity.

As can be seen in FIG. 2B, device 201 includes a plurality of haptic output devices 218 and an additional haptic output device 222. Haptic output devices 218-1 may comprise an actuator configured to impart vertical force to display 202, while 218-2 may move display 202 laterally. In this example, the haptic output devices are coupled directly to the display, but it should be understood that the actuators could be coupled to another touch surface, such as a layer of material on top of display 202. Additional actuator 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional actuator 222 comprises an eccentric rotating mass motor, a linear resonant actuator, or another piezoelectric actuator. Actuator 222 can be configured to provide a vibrotactile haptic effect in response to a haptic signal from the processor. The vibrotactile haptic effect can be utilized in conjunction with surface-based haptic effects and/or for other purposes.

In some embodiments, either or both haptic output devices 218-1 and 218-2 can comprise an actuator such as a piezoelectric actuator. In another embodiment, haptic output devices 218-1 and 218-2 may comprise an electromagnetic actuator, an electroactive polymer, a shape memory alloy, a flexible composite piezo actuator (e.g. an actuator comprising a flexible material), electrostatic, and/or magnetostrictive actuators. Additionally, a single actuator 222 is shown, although multiple other haptic output devices can be coupled to the housing of device 201 and/or other actuators 222 may be coupled elsewhere. Device 201 may feature multiple haptic output devices 218-1/218-2 coupled to the touch surface at different locations, as well.

Turning back to FIG. 2A, a user may interact with touch enabled display 202. And in response to the user interaction, one or more of the haptic output devices 218-1/218-2 may output a haptic effect. However, in some embodiments, the mobile device 201 may be used in an area comprising significant parasitic vibrations. In such an embodiment, the haptic effect may be tuned to be perceptible despite the parasitic vibrations. Thus, in some embodiments, when the device is in an area associated with parasitic vibrations, the haptic effect may comprise a haptic effect that is clearly distinguishable from the parasitic vibration. In some embodiments, this effect may comprise, for example, an electrostatic based effect, a skin stretch effect, or a surface deformation effect. Further, in some embodiments, this effect may comprise a non-vibration based effect. In other embodiments, when the device is no longer in an area associated with parasitic vibrations, the haptic effect may comprise a vibration based effect.

Illustrative Method for Haptics in Vibrating Environments or Devices

Figure 3:
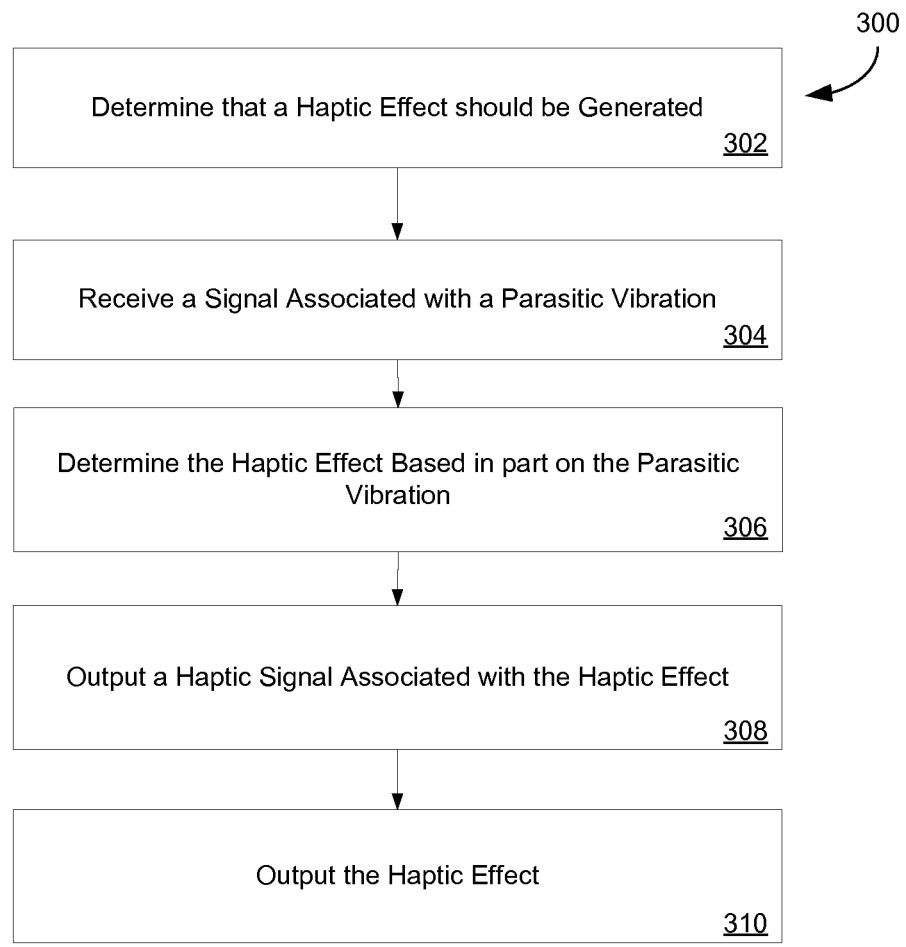
FIG. 3 is an illustration of a flow chart of one embodiment of a method for haptics in vibrating environments and devices.

Referring now to FIG. 3, FIG. 3 is a flow chart describing an exemplary embodiment for a method for haptics in vibrating environments or devices. In some embodiments, the stages in FIG. 3 may be implemented in program code that is executed by a processor, for example, the processor in a general purpose computer, a mobile device, or server. In some embodiments, these stages may be implemented by a group of processors, for example, a processor on a mobile device and processors on one or more general purpose computers, such as servers. The stages below are described with regard to the components of device 102 described above with regard to FIG. 1.

As shown in FIG. 3, the method 300 starts at stage 302 when processor 110 determines that a haptic effect should be generated. In some embodiments processor 110 may determine that a haptic effect should be generated as an alert associated with some component of the device 102. For example, in one embodiment, the haptic effect may be associated with the current battery level, the presence of a network or other type of connection, or some other features associated with the operation of the device. In other embodiments, the haptic effect may be associated with a task or application on the mobile device, for example, the haptic effect may be associated with a GPS application and comprise an indication that the user has arrived at a particular location. In another embodiment, the haptic effect may comprise an indication that a file has been downloaded, or that some operation or task has been completed.

Continuing to step 304 when processor 110 receives a signal associated with a parasitic vibration. In some embodiments the signal may be received from memory 112, which, in such an embodiment, may comprise a database associated with parasitic vibrations. For example, in some embodiments, memory 112 may comprise a database of one or more templates of parasitic vibrations. These templates may comprise data associated with parasitic vibrations in common environments. For example, in some embodiments the templates may comprise data associated with vibrations: on an airplane (e.g. in various levels of turbulence), a bus on various types of roads, a car on various types of roads, or another environment associated with background vibrations.

In another embodiment, the signal may be received from sensor 120, which is configured to detect the parasitic vibrations. In such an embodiment, sensor 120 may comprise, for example, an accelerometer. In another embodiment, sensor 120 may comprise a component of haptic output device 118. For example, in such an embodiment, haptic output device 118 may comprise a piezoelectric element. Further in such an embodiment, the piezoelectric element may be configured to output a signal associated with the parasitic vibrations of device 102. In some embodiments this signal may comprise data such as the magnitude or frequency of the parasitic vibration. In another embodiment, the signal may be received from a location system (e.g. GPS or AGS) that provides the current location and/or velocity. In such an embodiment, processor 110 may determine the user's current location and data about the vibration based on this information. For example, in such an embodiment, if processor 110 determines that the user is traveling at above a certain speed on the Interstate, processor 110 may determine that a specific type of parasitic vibration is likely present.

At stage 306 processor 110 determines a haptic effect based in part on the parasitic vibration. In some embodiments the haptic effect may be a haptic effect configured to compensate for the parasitic vibrations. For example, the haptic effect may comprise a vibration based effect configured to be felt in spite of the parasitic vibration, e.g. a haptic effect at a different frequency and/or amplitude than the vibration and thus is distinguishable from the parasitic vibration. For example, in such an embodiment processor 110 may ensure that any haptic effect is not output at a resonant frequency of the parasitic vibration by multiplying the frequency of the parasitic vibration by a fractional value (e.g. 1.3 or 1.7). In another embodiment, processor 110 may perform a Fast Fourier Transform (FFT) of the parasitic vibration to select frequency components that are not represented or not strongly represented by the parasitic vibration.

In another embodiment, the haptic effect may comprise an effect configured to compensate for the parasitic vibrations. For example, the haptic effect may comprise a vibration at a frequency and amplitude configured to compensate for, mask, interfere with, reduce, or cancel the parasitic vibration. For example, in one embodiment, the haptic effect may comprise a vibration at substantially the same frequency and amplitude as the parasitic vibration, but offset by 180 degrees, and thus configured to substantially cancel the effect of the parasitic vibration.

In yet another embodiment, the haptic effect may comprise an effect that is clearly distinguishable from the parasitic vibration and thus the parasitic vibration will have little or no effect on the haptic effect. For example, the haptic effect may comprise a skin stretching effect, an electrostatic based effect, or a surface deformation effect. For example, the haptic effect may comprise an effect configured to vary the perceived coefficient of friction on the surface of user input device 114. In another embodiment, the haptic effect may comprise an effect configured to raise or lower a segment of user input device 114 (e.g. create a surface deformation on user input device 114). In still another embodiment the haptic effect may comprise moving user input device 114, or a component of user input device 114, in a way that is perceptible to the user. In still another embodiment, the haptic effect may comprise an effect that is not associated with vibrations, and is thus perceptible despite the parasitic vibration.

In still another embodiment, the parasitic vibration may comprise a vibration associated with the normal operation of the device. For example, in such an embodiment, the device may comprise, for example, an electric razor, a kitchen appliance, or piece of industrial equipment. Thus, in such an embodiment, the parasitic vibration may be generated by a motor on the device. In such an embodiment, the haptic effect may be associated with controlling this motor, e.g. briefly stopping or slowing its operation, and thus generating a perceptible haptic effect by stopping or slowing the parasitic vibration. For example, in one embodiment a housing of the device may comprise a magnetorheological fluid, which changes viscosity when a magnetic field is applied. Thus, a magnetic field may be applied to vary the strength of the parasitic vibration. The user may detect this change in the parasitic vibration as a haptic effect. In another embodiment, the device may comprise one or more air sacs or shock absorbers that are used to vary the strength of the parasitic vibration and thus output a detectible haptic effect.

Next processor 110 outputs a haptic signal associated with the haptic effect 308. This haptic signal may be a digital or analog signal comprising the data needed for haptic output device 118 to output the haptic effect. In some embodiments, the haptic signal may be an analog drive signal for a haptic output device, while in some other embodiments the haptic signal may be a high-level signal comprising parametric information describing the haptic effect to be output (e.g. a command identifier and associated parameters). In such an embodiment, haptic output device 118 may comprise the internal capability of determining and outputting a haptic effect based on the command identifier and associated parameters.

At stage 310, haptic output device 118 outputs the haptic effect. In some embodiments, this haptic effect may comprise a vibration effect, which as described above is configured to be distinguishable from the parasitic effect. In other embodiments, it may comprise a different type of haptic effect, for example, an electrostatic friction effect, a surface deformation effect, or a skin stretch effect, configured to be felt distinctly from the parasitic vibration.

Illustrative Systems for Haptics in Vibrating Environments or Devices

Figure 4A:
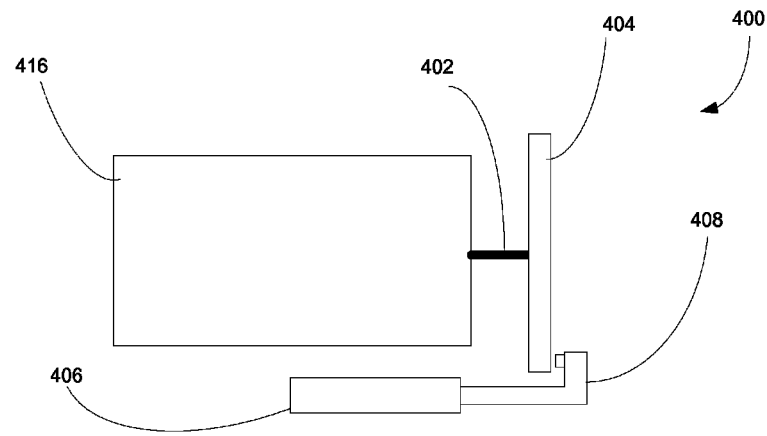
FIG. 4A is an illustration of one embodiment of a system for haptics in vibrating devices.
Figure 4B:
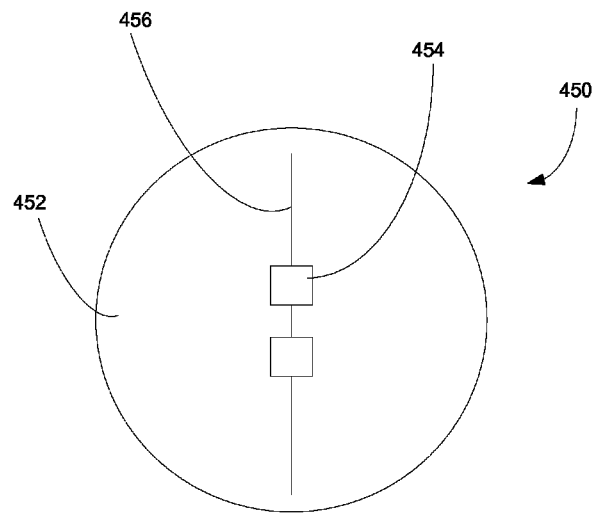
FIG. 4B is an illustration of another embodiment of a system for haptics in vibrating devices.

Referring now to FIGS. 4A and 4B, FIG. 4A is an illustration of a system for haptics in vibrating environments or devices according to one example embodiment. FIG. 4A comprises system 400, which may be mounted inside the housing of a device according to the present disclosure. As shown in FIG. 4A, the system comprises a motor 416 connected to a gear 404 via a shaft 402. In some embodiments, this motor may be configured to perform various tasks. For example, in one embodiment, motor 416 comprises the motor on a household appliance, such as a blender, coffee grinder, hand mixer, or some other known appliance. In other embodiments, motor 416 comprises a motor for use in industrial or commercial applications. For example, motor 416 may be a motor for use in a drill, saw, sander, or some other industrial tool.

According to some embodiments of the present disclosure, when motor 416 is in operation it outputs a vibration (described above as a parasitic vibration). According to some embodiments, rather than using an additional vibration to output a haptic effect, the processor instead outputs an effect associated with controlling this parasitic vibration. Accordingly, as shown in FIG. 4A, System 400 further comprises a braking mechanism 406 and brake 408, configured to brake gear 404.

According to one embodiment, when a processor determines a haptic effect to be output, the processor transmits a trigger signal to braking mechanism 406. In response, braking mechanism 406 pulls brake 408 against gear 404, thus slowing gear 404. When gear 404 slows, a torque is output on system 400 which may then be imparted on a device incorporating the system 400. The intensity of the torque is associated with the braking force applied to gear 404. Thus, braking mechanism 406 may be configured to apply varying pressures on gear 404 to provide varying levels of torque. For example, the processor may determine a weak haptic effect. In such an embodiment braking mechanism 406 causes the brake 408 to press lightly against the gear 404 to slow it only slightly, thereby outputting a small torque. In other embodiments, the processor may determine a strong haptic effect. In such an embodiment, braking mechanism 406 causes the brake 408 to press lightly against the gear 404 to slow gear 404 to a complete stop in less than a full rotation and thereby output a strong torque.

In other embodiments, the system shown in FIG. 4A may operate differently. For example, in some embodiments, braking mechanism 406 may not be present. In such an embodiment, electric motor 416 may be configured to output the haptic effect by quickly accelerating gear 404 or a flywheel or another mass coupled to the shaft 402 (not shown in FIG. 4A), and thereby output a torque. In such an embodiment, the system 400 may further comprise an energy store such as a capacitor or battery, configured to store and release energy to allow electric motor 416 to accelerate gear 404 quickly enough to output a torque.

FIG. 4B is an illustration of a system for haptics in vibrating environments or devices according to another embodiment of the disclosure. As shown in FIG. 4B, system 450 comprises a flywheel 452, moveable weights 454, and track 456. Flywheel 452 is configured to be rotated by an electric motor. For example, an electric motor associated with one of the devices discussed above with regard to FIG. 4A.

In one embodiment, the positions of the moveable weights 454 may be configured based on the application of a magnetic field. For example, the moveable weights 454 may comprise a material that is responsive to applied magnetic fields, such as iron or some composite materials. In some embodiments, the moveable weights 454 may comprise magnets. For example, a magnetic coil may encircle the flywheel 452 and be activated to draw the moveable weights 454 to the outer edge of the flywheel, or to return the moveable weights 454 to the center of the flywheel. In some embodiments, the moveable weights 454 may be held at or near a rest position, such as near the center of the flywheel 452 by springs to resist centrifugal forces while the flywheel is spinning. Such springs may then be overpowered by the application of a magnetic field to draw the moveable weights 454 to the edge of the flywheel 452.

When the moveable weights 454 move, they change the distribution of mass on the flywheel 452 and thus change the angular momentum of flywheel 452. This change in angular momentum causes flywheel 452 to output a force on the electric motor that is rotating it. The user holding the handheld device that the actuator is associated with may feel this force as a haptic effect. In some embodiments, this haptic effect may comprise rotating, or torqueing the handheld device in the user's hand.

In the embodiment shown in FIG. 4B, track 456 comprises a groove cut along a straight line through the center of flywheel 452. In other embodiments track 456 may comprise a different configuration. For example, in one embodiment, track 456 may be configured to keep both weights 454 at the center of flywheel 456 when a haptic effect is not being output. But when flywheel 452 receives a trigger signal from the processor, track 456 may be configured to allow weights 454 to move to the same part of flywheel 452 to provide an eccentric rotating mass.

In the embodiment shown in FIG. 4B, system 450 comprises two weights 454 and one track 456. In other embodiments, a different number of weights and tracks may be used. For example, in one embodiment, flywheel 452 may comprise three weights, and each weight may comprise its own track.

In other embodiments, not shown in FIG. 4A or 4B, rather than applying a brake or an eccentric rotating mass, the haptic effect may instead be output by modifying a component of the housing in which the electric motor is placed. For example, a housing of the device may comprise a magnetorheological fluid, which changes viscosity when a magnetic field is applied. Thus, a magnetic field may be applied to vary the strength of the parasitic vibration. The user may detect this change in the parasitic vibration as a haptic effect. In another embodiment, the device may comprise one or more air sacs or shock absorbers that are used to vary the strength of the parasitic vibration and thus output a detectible haptic effect.

Figure 5:
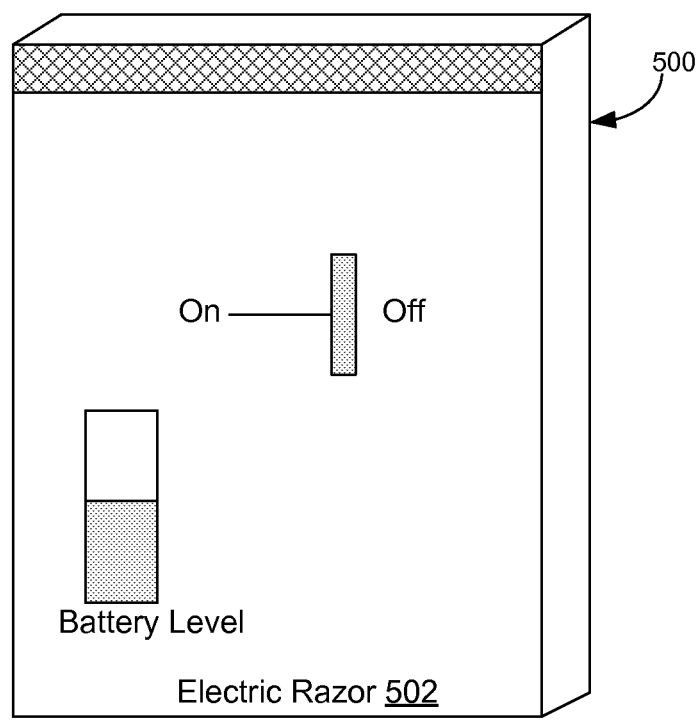
FIG. 5 is an illustration of another embodiment of a system for haptics in vibrating devices.

Turning now to FIG. 5 another embodiment of a system for haptics in a vibrating device is shown. Shown in FIG. 5 is system 500, which comprises an electric razor 502. The electric razor 502 comprises an electric motor, which outputs a parasitic vibration when in operation. Accordingly, in the embodiment shown in FIG. 5, Electric Razor 502 may implement a system for outputting a haptic effect in a vibrating device in order to provide haptic feedback to the user. In some embodiments, this may comprise one of the systems described above with regard to FIGS. 4A and 4B. In another embodiment, it may comprise making other operational changes to the operation of the electric motor in order to output a perceptible haptic effect. In some embodiments, this haptic effect may be associated with data associated with Electric Razor 502's operation. For example, the haptic effect may be associated with the current battery level of the device, i.e. a strong haptic effect may be associated with a warning that the battery level is low. In another embodiment, the haptic effect may be associated with other operational information, e.g. operating time, device setting (e.g. trimmer length), or the temperature of the motor of the device.

Advantages of Various Embodiments of the Present Disclosure

Embodiments of the present disclosure provide numerous advantages over conventional methods of providing haptic feedback. For example, embodiments described herein make haptic effects usable in devices that are prone to vibration. This may be useful for mobile devices that users carry into vibrating environments. Similarly, this may be useful for incorporating haptics into new locations, for example, control systems in cars, airplanes, trains, or buses.

Furthermore, embodiments of the present disclosure may enable haptics to be incorporated into devices that already output some vibrations. This may enable haptics to be incorporated into industrial applications and also household appliances. This will lead to these devices being more usable, as users will be able to receive information from devices through more than the traditional senses of sight and sound. This will ultimately lead to greater user satisfaction, and more efficient use of these devices.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising:
a haptic output device;
a processor coupled to the haptic output device, the processor configured to:
determine that a haptic effect should be generated;
receive a signal associated with a parasitic vibration;
determine the haptic effect configured to compensate for the parasitic vibration; and
output a haptic signal associated with the haptic effect to the haptic output device.

2. The system of claim 1, further comprising a user interface, and wherein the haptic output device is configured to output the haptic effect to the user interface.

3. The system of claim 1, wherein the signal associated with the parasitic vibration is received from a data store comprising data associated with parasitic vibrations.

4. The system of claim 1, wherein the signal associated with the parasitic vibration is received from a sensor configured to detect the parasitic vibration.

5. The system of claim 4, wherein the sensor comprises the haptic output device.

6. The system of claim 1, wherein the haptic effect comprises an effect configured to be felt distinctly from the parasitic vibration.

7. The system of claim 6, wherein the haptic effect comprises one or more of: a vibration at a frequency different than the frequency of the parasitic vibration or a vibration at a frequency and amplitude configured to mask the parasitic vibration.

8. The system of claim 6, wherein outputting the haptic effect comprises varying the parasitic vibration.

9. The system of claim 8, wherein varying the parasitic vibration comprises adjusting a feature of a component associated with the parasitic vibration.

10. The system of claim 6, wherein the haptic effect comprises one or more of: a non-vibration based effect, an electrostatic friction effect, a deformation of a user input device, or a skin stretch effect.

11. A method comprising:
determining that a haptic effect should be generated;
receiving a signal associated with a parasitic vibration;
determining the haptic effect configured to compensate for the parasitic vibration;
outputting a haptic signal associated with the haptic effect to a haptic output device; and outputting the haptic effect.

12. The method of claim 11, wherein the haptic output device is configured to output the haptic effect to a user interface.

13. The method of claim 11, wherein the signal associated with the parasitic vibration is received from a data store comprising data associated with parasitic vibrations.

14. The method of claim 11, wherein the signal associated with the parasitic vibration is received from a sensor configured to detect the parasitic vibration.

15. The method of claim 11, wherein the haptic effect comprises an effect configured to be felt distinctly from the parasitic vibration.

16. The method of claim 15, wherein the haptic effect comprises one or more of: a vibration at a frequency different than the frequency of the parasitic vibration or a vibration at a frequency and amplitude configured to mask the parasitic vibration.

17. The method of claim 15, wherein outputting the haptic effect comprises varying the parasitic vibration.

18. The method of claim 17, wherein varying the parasitic vibration comprises adjusting a feature of a component associated with the parasitic vibration.

19. The method of claim 15, wherein the haptic effect comprises one or more of: a non-vibration based effect, an electrostatic friction effect, a deformation of a user input device, or a skin stretch effect.

20. A non-transient computer readable medium comprising program code, which when executed by a processor is configured to cause the processor to:
determine that a haptic effect should be generated;
receive a signal associated with a parasitic vibration;
determine the haptic effect configured to compensate for the parasitic vibration wherein the haptic effect comprises an effect configured to be felt distinctly from the parasitic vibration;
output a haptic signal associated with the haptic effect to a haptic output device; and
output the haptic effect.

* * * * *